US005531113A

United States Patent [19]
Jamison

[11] Patent Number: 5,531,113
[45] Date of Patent: * Jul. 2, 1996

[54] BALLISTICS MEASURING SYSTEM

[76] Inventor: John R. Jamison, 84780 Christensen Rd., Eugene, Oreg. 97405

[*] Notice: The portion of the term of this patent subsequent to Oct. 25, 2011, has been disclaimed.

[21] Appl. No.: 310,963

[22] Filed: Sep. 22, 1994

Related U.S. Application Data

[63] Continuation-in-part of Ser. No. 131,200, Oct. 1, 1993, Pat. No. 5,357,796.

[51] Int. Cl.$^6$ .................................................. G01L 5/14
[52] U.S. Cl. .......................................... 73/167; 73/12.01
[58] Field of Search .................................. 73/167, 12.01, 73/147

[56] References Cited

U.S. PATENT DOCUMENTS

| 523,510 | 7/1994 | Brunswig . | |
| 2,696,105 | 12/1954 | Mackas . | |
| 2,812,660 | 11/1957 | Marden et al. . | |
| 2,813,421 | 11/1957 | Cheney et al. | 73/147 |
| 2,813,422 | 11/1957 | Schuessler . | |
| 3,024,645 | 3/1962 | Christoph . | |
| 3,130,575 | 4/1964 | Rogers . | |
| 3,718,041 | 2/1973 | Jones et al. . | |
| 4,002,064 | 1/1977 | Curchack . | |
| 4,479,378 | 10/1984 | Malakhoff . | |
| 4,685,330 | 8/1987 | Ford | 73/167 |
| 4,817,960 | 4/1989 | Wojcinski . | |
| 5,349,853 | 9/1994 | Oehler | 73/167 |

Primary Examiner—William A. Cuchlinski, Jr.
Assistant Examiner—Andrew Hirshfeld
Attorney, Agent, or Firm—Chernoff, Vilhauer, McClung & Stenzel

[57] ABSTRACT

A plurality of pressure transducers are spaced apart longitudinally along a mass of fluid so that they can sense disturbances in the fluid. A projectile launcher, which is typically a gun, is positioned such that the projectile launcher can be discharged to launch a projectile into the fluid. The pressure transducer(s) will sense the disturbance created in the fluid as the projectile passes through. A computer connected to the pressure transducers will process the output of the pressure transducers creating a response curve which is related to the energy dissipation of the projectile.

4 Claims, 3 Drawing Sheets

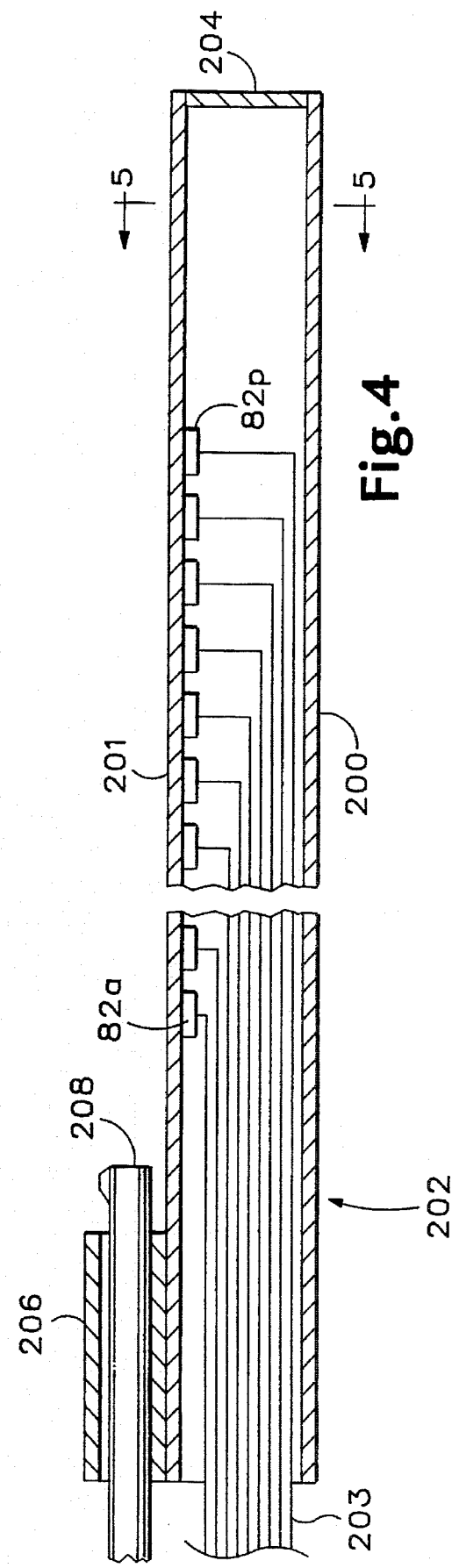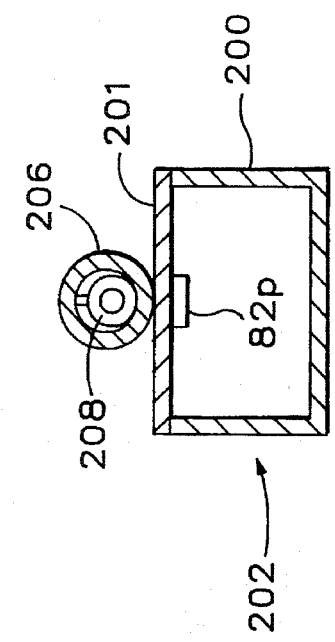
Fig.4
Fig.5

BALLISTICS MEASURING SYSTEM

This is a Continuation-in-Part of Ser. No. 08/131,200 filed Oct. 1, 1993, now U.S. Pat. No. 5,357,796.

BACKGROUND OF THE INVENTION

This invention relates to improvements in systems for measuring the ballistics of a projectile, such as a bullet.

A projectile of a given mass traveling at a given velocity carries a specific amount of kinetic energy [½ (Mass)(Velocity)$^2$] which is transferred to a target upon impact. Projectiles are readily weighed when at rest thereby facilitating the derivation of mass, and velocity is readily derived using a chronograph or other techniques. However, while mass and velocity are easily measured for a given projectile, the destructive characteristics of the projectile upon impact with a target, and more specifically the destructive characteristics of bullets, vary greatly depending upon the projectile's design and construction.

Two bullets of the same mass and velocity have identical kinetic energies, but depending upon the specific design and construction of the individual bullets they can have vastly different destructive characteristics. A projectile's destructive characteristics relate to how and when the bullet's kinetic energy is transmitted to its target upon impact. A bullet can be designed to have a "large wound" capacity, meaning that the bullet expands and dissipates its energy rapidly while penetrating very little upon impact, which results in a large wound to the surface of the target. In contrast, a bullet with the same mass and velocity as above can be constructed to change its shape more slowly and penetrate deeply into a target leaving a relatively small channel before expending the majority of its energy. Ballisticians design and construct bullets variably such that the majority of their kinetic energy is expended at desired variable predetermined depths upon impact with a target. The shape of the wound cavity in a target typically has a maximum diameter and specific shape which directly corresponds to the bullet's dissipation of energy.

Game hunters think of bullets in relation to their killing power, which can be defined as the bullet delivering an effective destructive force to significant vital organs of the target causing bodily functions to cease. Accordingly, of great interest to ballisticians is at what depth the majority of the energy of a bullet is dissipated, and the shape of the wound cavity. For example, a bullet whose energy is dissipated quickly upon impact ("large wound" capacity) will be relatively ineffective for causing significant damage to the vital organs of a deer or other large animal. However the same "large wound" capacity bullet will be highly effective for killing a squirrel because the depth of penetration required to strike vital organs is relatively shallow. In contrast, a small channel bullet whose maximum kinetic energy is delivered at a deeper depth will be highly effective for damaging the vital organs of a larger animal, such as a deer, and thereby has a high killing power in relation to that animal. The same small channel bullet, when used to kill a squirrel, will probably result in the squirrel's death but will emerge from the squirrel retaining most of its kinetic energy enabling the bullet to strike or ricochet into unintended targets. Ballisticians, with proper design and construction, can control the desired characteristics of energy dissipation of bullets to create highly effective bullets for their intended targets.

To test various bullet and other ordnance designs, ballisticians previously have relied upon a variety of devices and mediums, such as those shown in the following U.S. Pat. Nos.: 523,510; 2,696,105; 2,812,660; 3,024,645; 3,718,041; 4,479,378; and 4,817,960. Ordnance gelatin, which is primarily water, is the standard test medium and currently is widely used by ammunition and bullet makers, including the government, for attempting to determine the ballistic qualities of a given bullet. Gelatin and other mediums in current use are typically time-consuming to use and the information provided by them is sketchy at best. Ordnance gelatin, for example, must be mixed and allowed to gel in a special mold. Temperature is critical and each batch of gelatin must be calibrated and certified immediately prior to use. There is a limited time frame that the gelatin is of the proper consistency for testing ballistics. After discharging a bullet into the gelatin, most of the potentially useful information must be derived from the recovered bullet. Such desired information may include retained weight, frontal diameter and depth of penetration. A severe limitation with the gelatin approach is that the destructive cavity created in the gelatin, which relates to its energy dissipation, is temporary and collapses as the bullet passes through. Attempting to remedy this deficiency, ballisticians have employed burdensome and expensive high-speed cameras to record what occurs as the bullet passes through the medium. Although an improvement, high-speed cameras lack the precision necessary to determine accurately the energy dissipation and other information that would be desirable as the bullet passes through the medium. Further, after each test the bullet must be carefully dug out of the gelatin mold and a new block of gelatin molded. Ideally a ballistic testing system should use a low-cost medium that does not have to be reformed after each use so numerous tests can be performed in rapid succession. Further, a system should provide accurate information of the energy dissipation as a projectile passes through the medium and allow the projectile to be easily recoverable.

Another prior method of obtaining projectile information has been the installation of a strain gauge on a gun barrel to record strain during firing. However, this method produces no information regarding energy dissipation after a bullet leaves the barrel and strikes a target.

SUMMARY OF THE INVENTION

The present invention overcomes the foregoing drawbacks of the prior art by providing a fluid, such as a liquid, gas or gel, preferably but not necessarily contained in a vessel. At least one and preferably a plurality of pressure transducers are spaced apart along the mass of fluid so that they can sense disturbances in the fluid. A projectile launcher, which is typically a gun, is positioned such that the projectile launcher can be discharged to launch a projectile into the fluid. The pressure transducer(s) sense the disturbance created in the fluid at different times as the projectile passes through.

Preferably, the pressure transducer(s) feed data to a computer which processes the output of the pressure transducer(s) to display a response curve. The response curve is directly related to the energy dissipation of the projectile as it passes through the fluid, thereby giving precise information of the energy dissipation at different depths of projectile penetration in the fluid. This information is directly indicative of the damage caused by the projectile upon impact with its target.

This system eliminates the need for attempting to obtain energy dissipation information by high-speed photography, while producing significantly more accurate results. Further, the projectile can be recovered from the vessel and any information related thereto can be determined.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 4 is a partially schematic sectional view of an alternative exemplary embodiment of the present invention.

FIG. 5 is a sectional view taken along line 5—5 of FIG. 4.

DESCRIPTION OF THE PREFERRED EMBODIMENT

Figure 1:
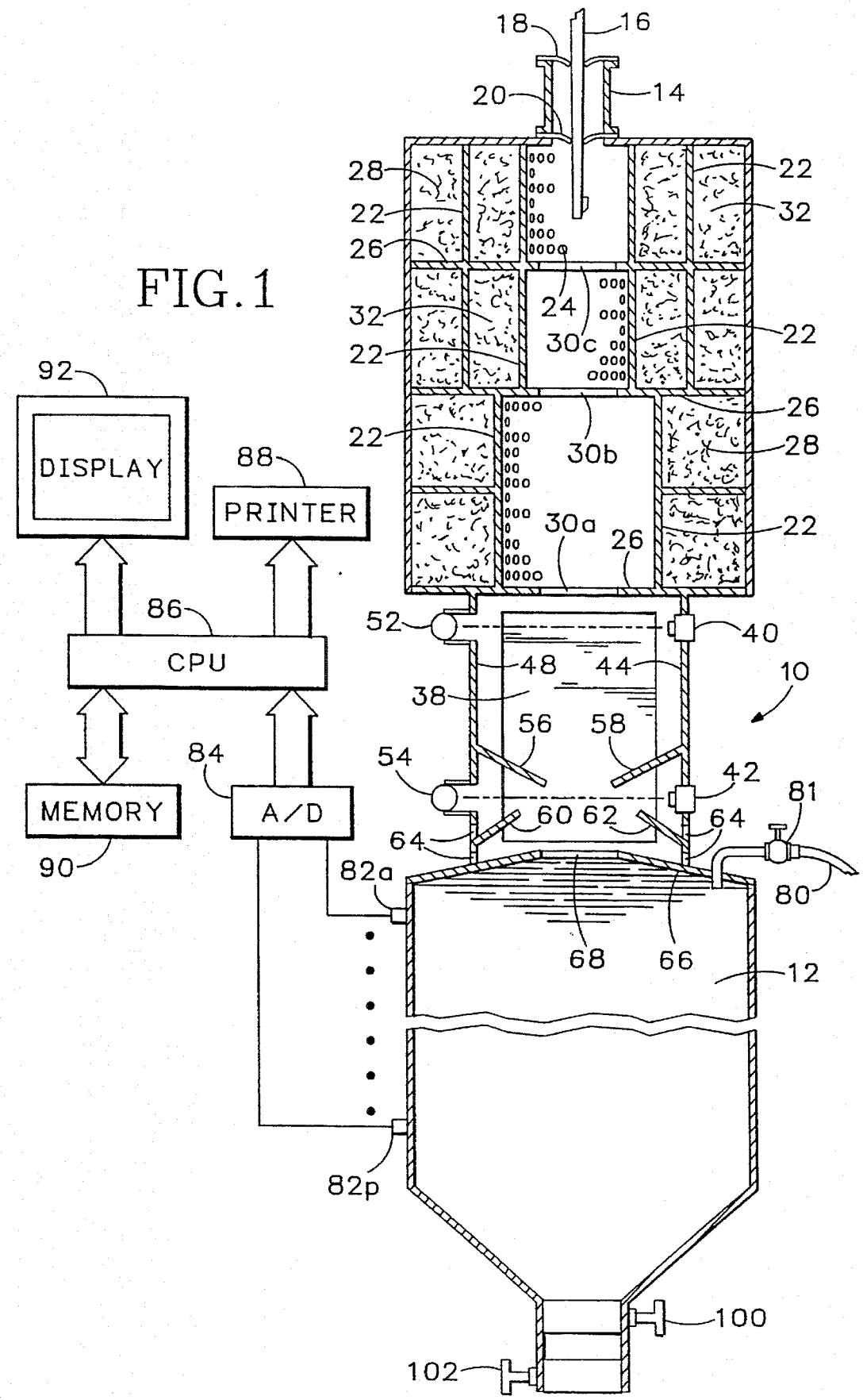
FIG. 1 is a partially schematic sectional view of an exemplary embodiment of a vessel for use in the present invention.

Referring to FIG. 1, a twenty-inch diameter cylindrical vessel 10, which is preferably metal, contains a fluid 12 in its lower portion which is preferably a liquid but could be a gas or a gel. Water is envisioned as the standard fluid 12 to be used due to its availability and low cost. A conventional rust inhibitor may be added to the water if desired. A housing 14 is mounted at the top center of the vessel 10 directly above the fluid 12 for housing a projectile launcher 16 of a firearm. Since the vessel's primary purpose is for measuring the ballistic qualities of bullets, the projectile launcher 16 would typically be a gun. The housing 14 includes an upper rubber grommet 18 and lower rubber grommet 20, each with a respective hole placed in its center for supporting and aligning the projectile launcher 16. The rubber grommets 18 and 20 provide a waterproof seal around the barrel of the projectile launcher 16 to contain any splash created by a projectile striking the fluid 12. The proper alignment of the projectile launcher 16 is maintained by the respective holes in the upper rubber grommet 18 and lower rubber grommet 20. The rubber grommets 18 and 20 also provide a shock-absorber effect upon discharge of a projectile.

The upper portion of the vessel 10 encompasses a structure that acts as a muffler for reducing the blast sound created by the projectile launcher 16 upon discharge. The muffler structure consists of concentric steel pipes 22 that are pierced with an extensive number of holes 24, preferably ¼" in diameter. The concentric steel pipes 22 are divided by a plurality of transversely positioned steel partitioning plates 26 with circular openings 30a, 30b, 30c in the center for the passage of projectiles. The concentric steel pipes 22 and partitioning plates 26 define circular cavities 32 for enclosing muffling material 28. The muffling material 28 can be anything that helps to muffle the blast sound created by the projectile launcher 16 upon discharge. Stainless steel curlicues from a machine shop work quite well as a muffling material and can be obtained inexpensively. By defining the circular cavities 32 to an appropriately small size, the muffling material 28 will not be able to settle extensively which could limit the muffling effect. The circular openings 30a, 30b, 30c of the partitioning plates 26 are designed to be wide enough for passage of a projectile even when the projectile launcher 16 is misaligned, but narrow enough to constrict and restrict the muzzle blast from affecting the operation of a timing section, described hereafter, preferably located in the midportion of the vessel 10. The length of the muffling section of the upper portion of the vessel 10 is preferably at least two feet long to provide adequate dissipation of the muzzle blast and sound.

The middle portion of the vessel 10 is preferably a timing section containing an access door 38 and a chronographing stage for measuring the velocity of each projectile as it passes. To calculate a precise kinetic energy of each projectile, the mass of each projectile is readily measured prior to discharge but its velocity is best measured for each individual bullet during flight. An upper chronograph screen 40 and a lower chronograph screen 42 are mounted on a flat plate 44. An upper light source 52 and a lower light source 54 directly oppose the respective upper chronograph screen 40 and lower chronograph screen 42 through openings in a flat plate 48. A projectile launched from the projectile launcher 16 disturbs the continuity of the light striking the upper chronograph screen 40 as it passes which, upon detection, indicates the time of passage. Shortly thereafter, the projectile passes the lower chronograph screen 42 and the time of passage is indicated in the same manner as the upper chronograph screen 40. Knowing the distance between the two chronograph screens 40 and 42, and calculating the time it took to travel between the two chronograph screens 40 and 42, the average velocity of the projectile between the two chronograph screens 40 and 42 is calculated. The timing section is in close proximity to the fluid 12 so the average velocity between the chronograph screens 40 and 42 is effectively the projectile's velocity when it strikes the fluid 12. In addition, knowing the distance from the lower chronograph screen 42 to the fluid 12 allows the calculation of the time when the projectile will strike the fluid 12.

After the projectile strikes the fluid 12 a splash will occur. The splash will primarily strike the lowest partitioning plate 26 and interior of the timing section, then flow down angled flat baffles 56, 58 into the fluid 12 through an opening 68 in an annular ceiling 66. Other flat baffles 60, 62 provide protection from the splashed fluid 12 for the lower chronograph screen 42 and lower light source 54. Similar baffles (not shown) can be provided for the upper chronograph screen 40 and light source 52. Multiple holes 64 drain any fluid to the exterior of the vessel 10 accumulated on the upper surfaces of the baffles and ceiling 66 due to splashing.

A hose 80 initially fills the fluid 12 and replenishes the fluid which drains out the holes 64. The ceiling 66 is higher toward the opening 68 to prevent any air pockets from forming on its bottom side. The valve 81 can be set to supply a continuous flow which will cause the extra fluid 12 to flow through the opening 68 over the top of the ceiling 66 and to the exterior of the vessel 10 through holes 64. This provides a continuously-full fluid 12 within the vessel 10 whereby any lost fluid 12 is automatically replenished. The upper surface of the fluid 12 will thus always be at a constant level.

If desired, a conventional self-sealing membrane (not shown) can be placed over the opening 68 in the ceiling 66 to prevent splash.

As the projectile strikes the fluid 12 it will decrease in velocity while dissipating its kinetic energy into the fluid 12 simulating the striking of a target, such as a game animal. By changing the type of fluid 12 in the vessel 10, the apparatus can be used to simulate the effects of projectiles on different targets if desired. The projectile will create momentary disturbance pressures in the fluid 12 as it passes through the fluid, which pressures will have magnitudes representative of the projectile's energy dissipation. The disturbances in the fluid 12 are measured by pressure transducers 82a–82p affixed at regular intervals to the vessel 10. Preferably, the pressure transducers 82a–82p are strain gauges affixed to the exterior of the vessel 10 oriented to measure the hoop strain created by the disturbance pressures expanding the vessel 10. Alternatively, pressure transducers penetrating the vessel and exposed directly to the fluid 12 could be used. Most inexpensive computer data acquisition hardware and associated software allow for up to sixteen channels, and it has been found that sixteen strain gauges at 1.5-inch spacing are very adequate to provide the required accuracy, although a lesser number could be used with a proportional decrease in the amount and accuracy of the information. The analog outputs of the pressure transducers are connected to an analog-to-digital (A/D) converter 84 for input to a digital CPU 86. The CPU 86 is connected to an output device 88, memory 90, and display 92.

Figure 2:
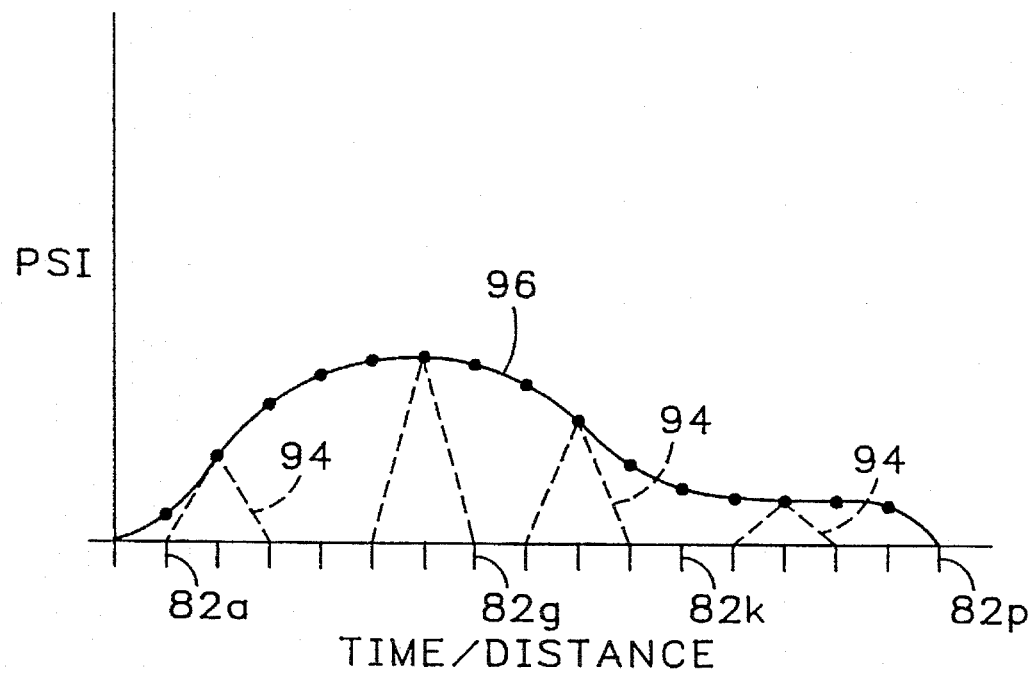
FIG. 2 is an exemplary projectile response curve obtained by use of the present invention.
Figure 3:
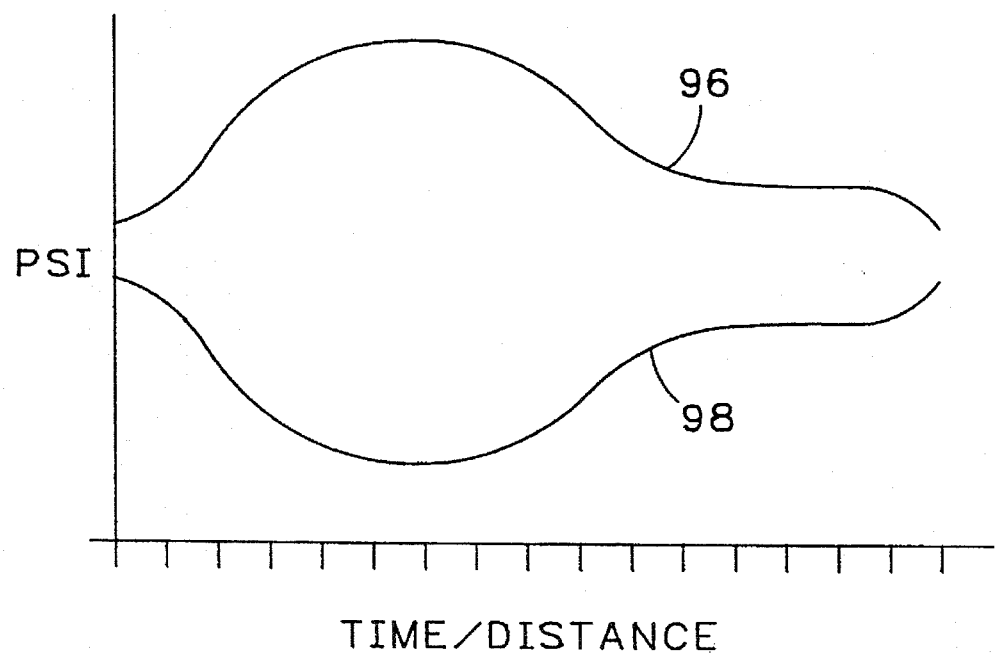
FIG. 3 is an exemplary projectile response envelope obtained by use of the present invention.

Referring to FIG. 2, as the projectile passes through the fluid 12 each pressure transducer 82a–82p transmits its sensed pressure readings to the A/D converter 84, which in turn sends the data to the CPU 86. Each pressure transducer 82a–82p is calibrated to read zero prior to impact of the projectile with the fluid 12, then raises to a maximum reading and returns back to zero after the disturbance effects have dissipated, as represented generally by the respective dotted lines 94 shown for several of the transducers. The maximum reading recorded for each pressure transducer 82a–82p will be approximately the time when the bullet is directly horizontal from the respective pressure transducer 82a–82p. The CPU 86 processes the data received from each pressure transducer 82a–82p, preferably selecting the maximum value from each pressure transducer 82a–82p, displaying a response curve 96 showing the maximum values and interpolating a smooth curve. The response curve 96 is directly related to the energy dissipation of the projectile. The response curve 96 can be displayed as PSI versus distance, which relates to the spacing of the pressure transducers or, alternatively, as a PSI versus time curve. Such a graphical response curve 96 allows ballisticians to quickly view the energy dissipation profile and make design and construction decisions based on their experience. New modifications to the projectiles are tested in the vessel 10 and compared to the results of the prior tests providing accurate comparisons. By modifying the design and construction of projectiles, ballisticians can design a projectile such that the PSI values on the response curve 96, relating to the energy dissipation, have an optimum profile such that the projectile will have the desired effect on its intended target. In addition ballisticians can determine: the rise time and fall times of the response curve 96; individual transducer pressure curves 94; area under the response curve 96; rate of deceleration; rate of energy transmission; amplitude of energy transmitted at various depths/time; and volume of the hydrostatic shock cavity which is widely used to describe the destructive effects of a high-velocity projectile. FIG. 3 shows a response envelope which consists of a response curve 96 and an inverted response curve 98, providing a graphical representation of a shock cavity familiar to ballisticians.

The lower portion of the vessel 10 contains a pair of gate valves 100 and 102 for the recovery of projectiles. Opening the upper valve 100, then closing it, then opening the lower valve 102 allows the projectile to be retrieved along with only a small amount of accompanying fluid 12 which is continuously replenished from the hose 80.

With reference to FIGS. 4 and 5, an alternative embodiment of the present invention involves employing a U-shaped steel channel 200 to which a flat steel plate 201 is affixed with a water tight seal to form a rectangular tube 202. A plurality of pressure transducers such as 82a–82p can be mounted centrally within the steel tube 202 at spaced-apart intervals along the length of the tube within a vessel containing a fluid. A plurality of wires 203, each connected to a respective pressure transducer, are routed through the center of the tube and out one end thereof to an external analog-to-digital (A/D) converter for input to a digital CPU. The other end of the tube is sealed with a water tight plug or cover 204. An elongate alignment fixture 206 is attached to an end portion of the tube from which the wires extend, and preferably to the exterior of the steel plate 201. The alignment fixture is aligned in parallel with the tube and is preferably cylindrical with a central opening sized to receive and support the barrel 208 of a rifle or handgun. The tube 202, including the attached alignment fixture, is connected to a supporting stand to maintain the gun received in the alignment fixture above a vessel (not shown) containing a fluid, such as water. The tube 202 extends into the fluid submerging the pressure transducers, while the gun remains above the fluid. A projectile launched from the gun barrel travels through the fluid in close proximity to the pressure transducers which sense the disturbances created by the projectile and transmit analog signals to the analog-to-digital (A/D) converter. Locating the pressure transducers within such a tube provides an apparatus that is considerably smaller, more portable and less expensive than the previously described fluid vessel with attached pressure transducers. Additionally, the projectile travels in close proximity to the pressure transducers which provides a more precise measurement of the dissipation of energy as it passes each pressure transducer. Furthermore, unlike the fluid vessel with attached pressure transducers, the tube does not result in data specific to the particular vessel design. Accordingly, the tube can be used in combination with a wide variety of vessels that have a sufficient diameter for the tube and are constructed of a suitably strong material to withstand the pressure created by the projectile upon discharge. If a vessel with a relatively large diameter is used, pressure disturbances created by the projectile that reflect off the sides of the vessel prior to impacting the pressure transducers will likely occur after the projectile has traveled over its completed path, thereby not interfering with the results.

Another alternative embodiment of the present invention involves eliminating the use of the vessel. By placing the tube 202 with the pressure transducers under or within a self-supporting mass of fluid, such as ordnance gelatin, the pressure transducers can sense disturbances created therein by the projectile. Alternatively, the pressure transducers can be simply attached to a plate upon which the self-supporting fluid mass rests to sense disturbances created therein and send analog signals to the analog-to-digital (A/D) converter. This allows for the continued use of ordnance gelatin, which has been the defacto standard in the ballistics industry. Unlike the prior systems that measure the deformation of the gelatin with high speed cameras and determine information from the projectile extracted from the gelatin, the new method of using pressure transducers with a mass of fluid allows rapid and precise measurements to be taken, stored, and analyzed by a computer. Also, the mass of fluid, with associated pressure transducers, allows the projectiles to be fired horizontally into the mass of fluid which makes it readily adaptable to existing ranges that are standard for ammunition and bullet manufacturers.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of measuring the ballistics of a projectile, comprising the steps of:

(a) providing a mass of fluid;

(b) creating a disturbance in said fluid by launching said projectile out from a firearm into said fluid;

(c) sensing at different times during the passage of said projectile through said fluid the pressure exerted by said disturbance within said fluid.

2. The method of claim 1, further including providing a vessel containing said fluid.

3. The method of claim 2, wherein step (c) comprises sensing said pressure by measuring the deformation of said vessel.

4. The method of claim 1, further comprising the step of recording the respective pressures exerted at said different times and producing a response curve representative thereof.

* * * * *